United States Patent [19]
Bontrager et al.

[11] 3,858,899
[45] Jan. 7, 1975

[54] FOLDING CART - BAGGIE CART

[76] Inventors: Harris W. Bontrager, Montpelier, Ind.; George Spector, both of c/o George Spector, 3615 Woolworth Bldg., 233 Broadway, New York, N.Y. 10007

[22] Filed: Nov. 7, 1972

[21] Appl. No.: 304,333

[52] U.S. Cl............................................. 280/36 R
[51] Int. Cl......................................... B62b 11/00
[58] Field of Search............ 280/36 R, 36 C, 47.24, 280/47.37 R, 62; 248/98

[56] References Cited
UNITED STATES PATENTS

| | | | |
|---|---|---|---|
| 2,141,881 | 12/1938 | Schray | 280/36 R |
| 2,422,862 | 6/1947 | Stottrup | 280/36 R |
| 2,479,467 | 8/1949 | Bryant | 280/36 C |
| 2,600,611 | 6/1952 | Benington | 280/36 C |
| 3,041,026 | 6/1962 | Wilson | 280/47.24 |

Primary Examiner—Robert R. Song

[57] ABSTRACT

A folding cart comprising first and second parallel vertical members having handles secured to the top ends, a horizontal axis supported in the bottom ends of the members and extending therebetween; first and second vertical wheels lying in planes perpendicular to the plane of the members and secured to opposite ends of the axle; a platform secured at one side to both members and pivotable between vertical and horizontal positions; and a third vertical wheel lying in a plane parallel to the other wheels and rotatably secured to the platform at a point remote from said members.

1 Claim, 5 Drawing Figures

PATENTED JAN 7 1975

3,858,899

FOLDING CART - BAGGIE CART

SUMMARY OF THE INVENTION

This invention is directed toward a collapsible or folding cart which can be used to transport flexible containers such as bags filled with goods such as groceries over a distance and which can be folded to be stored in minimum space when not in use.

To this end, my cart comprises two vertical members having handles secured to the top ends and a horizontal axle disposed in and extending transversely between the bottom ends. First and second vertical wheels lying in planes perpendicular to the plane of the members are rotatably secured to opposite ends of the axle.

A platform having at one side a vertical rotatable support wheel lying in a plane parallel to and disposed intermediate the first and second wheels is pivotally secured at the other side to both members at a point below the axle. The platform can be pivoted vertically upward along the members or can be pivoted horizontally outward.

A frame is pivotally secured at one side to both members adjacent the top ends. The frame can be pivoted vertically, downward along the members or horizontally outward.

With frame and platform in horizontal position, a bag can be secured at its open top end to the frame with its bottom end disposed downward and resting on the platform. The bag can be filled and the cart and bag wheeled from one place to another as the operator pushes on the handles.

When the bag is removed and the frame and platform pivoted into vertical position, the cart can be collapsed into minimum space for storage.

DETAILED DESCRIPTION OF PREFERRED EMBODIMENTS

Figure 1:
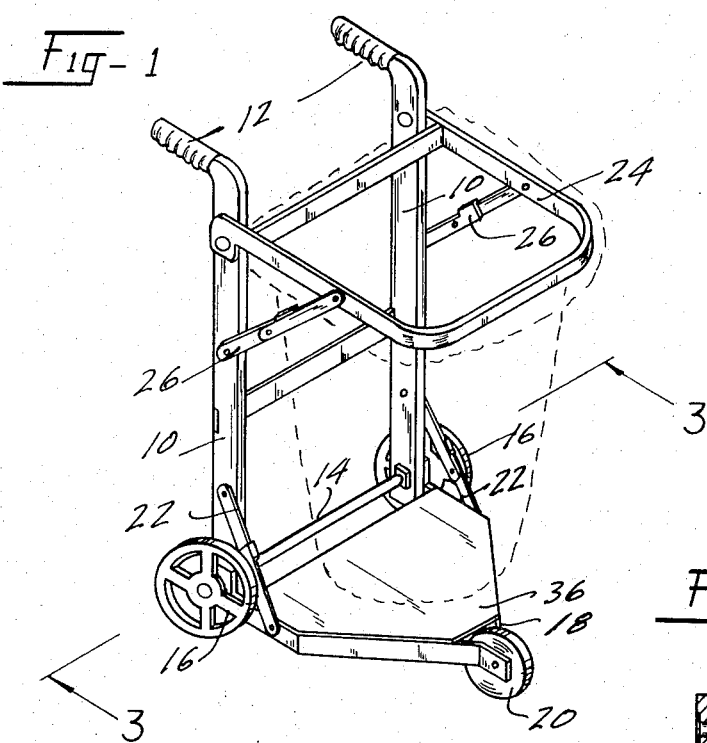
FIG. 1 is a perspective view of my invention ready for use.
Figure 2:
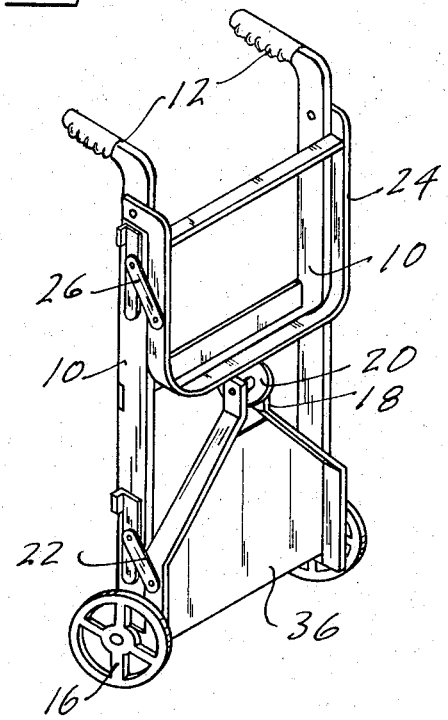
FIG. 2 is a perspective view of my invention in folded position.
Figure 3:
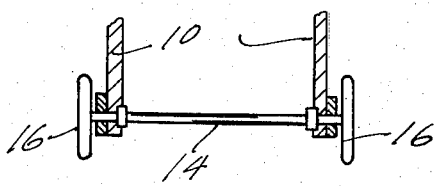
FIG. 3 is a view taken along line 3—3 in FIG. 1.

Referring first to FIGS. 1–3, first and second elongated vertical members 10 have handles 12 secured to the top ends and extending at right angles. A horizontal axle 14 is secured in and extends between the bottom ends of the members. Wheels 16 are secured in vertical rotatable position to opposite ends of the axle.

A horizontal platform 36 has a small outer end with support 18 for a vertical rotatable wheel 20 parallel to and disposed intermediate wheels 16. Foldable extendable locking linkages 22 secure the other end of the platform to the members below the axle. The platform can thus be locked into vertical upward position or pivoted into horizontal outward position and locked therein.

A rectangular open frame 24 is secured by foldable extendable locking linkages 26 to the members at a point adjacent the top ends. The frame can be pivoted vertically downward or horizontally outward and locked into position.

Figure 5:
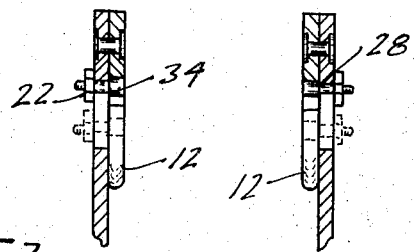
FIG. 5 is a view taken along the line 5—5 of FIG. 1.
Figure 4:
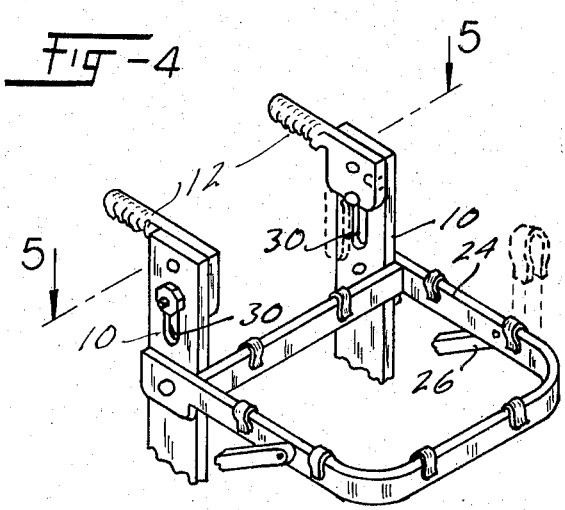
FIG. 4 is a detail perspective view of a modification of the structure of FIG. 1.

Referring now to FIGS. 4 and 5, the handles can have holes 28 alignable with vertical slots 30 in the members 10 and can be secured by nuts 32 and bolts 34 extending through aligned holes and slots. The handles can thus be locked either into horizontal position for use or vertical storage position at which the handles extend along the members.

While certain novel features of our invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A folding cart having spaced parallel similar vertical members with a pair of handles extending transversely outwardly from the upper ends of said members, including an axle mounted perpendicularly through the lower ends of said members and having a pair of wheels mounted on the outer ends of the axle whereby the members have outer sides disposed parallel to and between said wheels, in combination with a platform adjustably attached to the lower ends of the sides of said members by a pair of similar pivotable foldable linkages, each of said linkages being pivoted at one end to the lower end of respective one of said members above said wheels, and at the opposite end each linkage being pivoted to the platform at a point at the same elevation of the wheel axle when the platform is extended horizontally and whereby said linkage permits upward folding of the platform to a vertical position parallel and closely adjacent to said members, including a front wheel mounted on bracket extending in front of the platform, said front wheel having an axis parallel to the axle at a level sustantially same as that of the platform whereby the wheel extends the same distance below and above the platform, in further combination with a frame adapted to support the upper perimeter of a bag, including means for mounting the frame pivotally on the members whereby the frame is pivotable from an upper horizontal position extending in front of the handles and members, downwardly to a vertical position adjacent the members, said means including a folding linkage to maintain the frame in the horizontal position and collapsible to permit downward pivoting of the frame to the vertical position, wherein the handles are pivotally mounted on the members, each of said handles having an upper pivot whereby the handle is movable from a horizontal to a vertical position adjacent the members, each of said members including an adjustable stop mounted in a slot in each of said members, said stop being movable from an upper position to a lower position, whereby each handle engages said stop in said upper and lower position to retain the handle in said upper and lower position including clips for securing removably the bag on said frame.

\* \* \* \* \*